3,089,776
PROCESS FOR PREPARING CHEESE
MAKING CURD
Carl A. Ernstrom, Madison, Wis., assignor to Wisconsin
Alumni Research Foundation, Madison, Wis., a corporation of Wisconsin
No Drawing. Filed Sept. 29, 1960, Ser. No. 59,206
16 Claims. (Cl. 99—116)

The present invention relates to an improved process of preparing cheese making curd including curds adaptable for use in the manufacture of cottage cheese and other cheese products.

Illustrative of prior practices of preparing cheese making curd is that employed in the manufacture of cottage cheese. Cottage cheese, for example, has conventionally been made from skim milk by addition of a starter culture with or without the addition of rennet. A small amount of food grade calcium chloride can also be added to aid in coagulation and the firming of the curd. The starter culture, usually referred to as "latic starter," contains acid producing organisms and for the most part a latic acid producing organism, such as *Streptococcus lactis* or *Streptococcus cremoris*. It is the acid that drops the pH that produces coagulation of the milk into a smooth firm gel from which the cottage cheese curd is made. No agitation is necessary as the acid is uniformly developed in situ in the skim milk by the bacteria.

The most serious problems in the manufacture of cheese making curds by the process noted above are related to abnormal or erratic behavior of the starter cultures. Such problems may involve slow acid development, excessive gas production accompanied by floating curd, abnormal flavors, and in some instances complete inhibition of acid development. At best these problems result in lack of product uniformity, and at worst a complete loss of the milk.

Another of the serious problems in the use of a starter culture is the length of time needed to produce a curd after the starter is added to the milk. In addition to the time required for curd formation is the additional equipment needed just for storing the milk during the curd formation.

Attempts to overcome these problems and make a cheese making curd by the direct addition of acid to milk, e.g. to duplicate the pH achieved by bacterial fermentation, have proven unsuccessful. The reason for this is that in this process, unlike the conventional process where the acid is formed in situ by bacteria, agitation is necessary to get the added acid intimately mixed with the milk, and agitation at the time of coagulation has been found to prevent the formation of a firm curd. Up until the present invention, all variations of this process calling for the direct addition of acid have failed to provide a satisfactory cheese making curd, the processes for the most part yielding only a fine precipitate or a product having a consistency like cultured buttermilk.

During investigations in the preparation of casein it was noted that coagulation at 2° C. required the addition of considerably more acid and a lower pH than when acidification was carried out at room temperature. With further investigations it was then discovered that firm curd suitable for the manufacture of cheese, could be made by (1) adding a water-soluble, non-toxic acid to cool liquid milk, (2) agitating the cool mixture to get the acid intimately mixed with the milk, and then (3) allowing the resulting mixture to warm without agitation, providing the temperature of the milk in steps (1) and (2) was below the point at which coagulation takes place and the temperature of the milk in step (3) was at or above the point at which coagulation takes place.

The liquid milk used in the process of the present invention can be (a) skim milk to produce a cheese making curd low in milk fat, (b) whole milk to produce a cheese making curd high in milk fat, and (c) mixtures of skim milk and whole milk to produce cheese making curds with intermediate or varying contents of milk fat. The milk used in the process of the present invention can be fresh milk or reconstituted milk made from non-fat, dry milk solids or dry milk solids containing various amounts of milk fat. Various mixtures of fresh milk with the dry milk solids can also be used as illustrated in the following examples.

*Example I*

Fresh raw skim milk is pasteurized by heating to 143° F. for 30 minutes. The pasteurized milk is cooled to 43° F. or lower. Four liters of the cold skim milk are treated with 18 ml. of concentrated hydrochloric acid (36.5 to 38.0% HCl) and stirred until the acid is uniformly mixed with the milk. The amount of acid added is such that the pH of the acidified milk is about 4.6 when measured at 70° F. The acidified milk is warmed to a temperature of 75° F. while the milk remains in a quiescent state. Agitation of the milk during warming must be avoided. Warming may be accomplished by standing at room temperature, by steam or hot water or electrically by dielectric or resistance heating. The curd which forms during warming is cut with curd knives into ¼" cubes or into any sized cubes desired. The remainder of the process follows the conventional cottage cheese making operation which is outlined below.

After the curd is cut it is allowed to remain undisturbed for about 15 minutes. The curd and whey mixture is then gently agitated as heat is applied in such a way that the temperature is increased to about 115° to 125° F. during a period of 1½ to 2 hours. The firmness of the curd determines the final cooking temperature and the length of time the curd is held in the hot whey prior to draining. Usually the whey is drained from the curd about 2 hours after heating is started. When the whey is removed from the curd, it is replaced with wash water at about 85° F. and stirred to temper the curd. The first wash water is then drained and a second application of wash water at about 60° F. is added, mixed with the curd, and drained. Finally, a third application of wash water is made at as low a temperature as possible, e.g. 50° F. The total volume of the water used in the three washes is usually equal to the original volume of milk from which the cheese was made. After the final wash water is drained, the curd is ready for creaming and packaging in accordance with standard procedures in the art.

*Example II*

This example is in accordance with Example I except that non-fat, dry milk solids are added to 10,000 pounds of skim milk to bring the total solids content up to 10 to 12% by weight, and rennet, in amounts of about 2 ml. of commercial rennet extract per 1000 lbs. of milk, is added to the skim milk mixture just prior to or after the addition of about 51.6 pounds of hydrochloric acid. The process otherwise is in accordance with Example I.

*Example III*

This example is in accordance with Example II, except that reconstituted skim milk made by dispersing non-fat dry milk solids in water is employed in place of conventional skim milk. The amounts of milk solids in the reconstituted porduct can vary as, for example, from about 8.5%, as found in conventional skim milk, to the higher percentages employed in Example II. Rennet can also be used in Example I.

Example IV

This example is in accordance with Example I, except that cool whole milk is employed in place of the skim milk used in Example I.

Example V

This example is in accordance with Example I, except that cool milk made up of a mixture containing about equal proportions of whole milk and skim milk is used in place of the skim milk in Example I.

Example VI

This example is in accordance with Example II, except that the non-fat, dry milk solids are added to whole milk in place of the skim milk in Example II. Mixtures of whole milk, skim milk and dry milk solids, including milk powder made from whole milk or skim milk, can be employed in a similar manner. Also, in place of hydrochloric acid employed in the above illustrative examples other water-soluble, non-toxic acids can be used as noted below.

The advantages of the chemical process over microbiological acidification include: absolute control over acidity in the cured, problems due to abnormal fermentations are eliminated, bacteriological inhibitors cannot affect the curd-making process, uniformity of the final product is more easily achieved, the procedure is more adaptable to mechanization, and control of acid and cutting temperatures enables variation in final curd firmness to suit particular markets. Also, the chemical process lends itself more readily to public health supervision and bacteriological examination because the cheese making curd should contain no more bacteria than those contributed by the pasteurized milk used in the making of the cured.

In the above examples, the pasteurized treatment is conventional and shorter times, e.g. 16 seconds at 162° F., can be employed if desired. The temperature of the milk at the time the acid is added can vary, for example, to about freezing (about 32° F.) up to about 65° F., but for most purposes temperatures around about 35 to 45° F. are preferred. The acids used can be any water-soluble, non-toxic acid, including inorganic or mineral acids such as hydrochloric and phosphoric acids, and organic acids such as lactic and acetic acids, or any equivalent water-soluble acid which does not leave toxic residues when washed from the curd as described above. The amount of acid added to the milk may vary depending on the solids content of the milk and the concentration of the acid, with optimum amounts being readily predetermined by preliminary test on small samples of the milk. In all cases the amount of acid added to the milk and the temperature of the milk at the time the acid is mixed with the milk should be such that no coagulation takes place. In all cases the amount of acid added to milk also should be such that coagulation of the milk takes place when the acidified milk is held in a quiescent state and warmed up or heated as for example up to 90 to 100° F. These critical factors can be readily ascertained by taking a sample of the commercial batch of milk from which the curd is to be made, and slowly mixing the acid with the sample while held at 70° F. to determine, e.g. by the standard titration procedure, how much acid is required to provide the milk, when at the 70° F. temperature, with a pH within the range of about 4.3 to 5.1, and perferably with a pH of about 4.5 to 4.7. The correct amount of acid required to provide the desired pH at 70° F. can then be readily calculated for use with the commercial batch of milk. While the above procedure is preferred this also can be done by adding acid to a sample of milk and noting the amount of acid or pH of the acidified milk at which coagulation starts, and then adding acid to another sample of milk at the same temperature until the amount of acid or pH approaches but does not reach the point at which coagulation starts, and then warming the acidified uncoagulated milk of the second sample while in a quiescent state and noting the temperature at which the milk coagulates and the curd sets. To be on the safe side and be sure that no coagulation takes place during agitation, i.e. during the mixing of the acid with the milk, the amount of acid added preferably should be insufficient to cause coagulation until the acidified milk is warmed up about 10° F. above the original temperature of the milk, i.e. the temperature at which the acid is added with a temperature difference of about 15 to 35° F. being preferred. This can be readily done by ascertaining, as described above, the pH or amount of acid required to start coagulation in milk at a specified temperature, adding lesser amounts of acid to a few samples of the same milk at the same temperature to provide mixtures with a range of acidic pH values above the pH value at which coagulation starts, and then warming these samples and noting the sample which coagulates when its temperature is about 10° F. (or more) above the original temperature of the milk prior to warming.

In one of the preferred procedures, the acid is added to the cool milk, the temperature is raised rapidly with agitation to a point just short of the temperature at which the milk coagulates, stopping agitation, and then maintaining the milk in a quiescent state while continuing heating the milk without agitation until coagulation takes place. The temperature at which the milk coagulates and the temperature at which heating with agitation should be stopped can be readily ascertained as indicated above by running preliminary tests on the milk from which the curd is being made.

Coagulation is tied into the temperature-pH relationship as well as the isoelectric point of casein, and may involve, among other things, a change in dissociation constant of the milk constituents during the warming or heating of the acidified milk. The system is complex and other factors may also be involved.

The process of the present invention carried out with liquid milk (including fresh and reconstituted milk and mixtures of the same) does not require bacteria including acid-forming bacteria but rennet in various amounts can be used along with the water-soluble, non-toxic acid where desired to improve the curd. Also, flavors including starter distillate can be added to the curd to provide desired taste or flavor. It is apparent that these modifications and equivalents thereof fall within the scope of the present invention.

It is claimed:

1. The process of preparing cheese making curd which comprises adding a water-soluble, non-toxic acid to cool liquid milk, agitating the resulting cool acid-milk mixture and then warming the mixture without further agitation until the milk coagulates and forms a curd.

2. The process of preparing cheese making curd which comprises adding a water-soluble, non-toxic acid to cool liquid milk, agitating the acidified milk with rapid warming up to a point short of the temperature at which the acidified milk coagulates, stopping the agitation, and then maintaining the milk in a quiescent state while continuing the warming of the milk until the milk coagulates and forms a firm curd.

3. The process of preparing cheese making curd which comprises adding a water-soluble, non-toxic acid to cool liquid milk at a temperature up to 65° F., the amount of said acid added being such as to bring the acidity of said milk when at a temperature of 70° F., within the pH range of about 4.3 to 5.1, stirring the resulting acid-milk mixture while maintaining the temperature below 65° F., and then warming the stirred acidified milk without agitation and while the acidified milk remains in a quiescent state until the milk coagulates and forms a firm curd.

4. The process of claim 3, where the cool liquid milk is skim milk.

5. The process of claim 3, where the cool liquid milk is whole milk.

6. The process of claim 3, where the cool liquid milk is a mixture of skim milk and whole milk.

7. The process of claim 3, which includes the addition of rennet to the milk prior to the coagulation of the milk.

8. The process of claim 3, where the water-soluble, non-toxic acid is hydrochloric acid.

9. The process of claim 3, where the water-soluble, non-toxic acid is phosphoric acid.

10. The process of claim 3, where the water-soluble, non-toxic acid is lactic acid.

11. The process of claim 3, where the water-soluble, non-toxic acid is acetic acid.

12. The process of preparing cheese making curd which comprises adding a water-soluble, non-toxic acid to cool milk at a temperature of about 35 to 45° F., the amount of acid added being such as to provide the milk, when at a temperature of 70° F., with a pH of about 4.5 to 4.7, stirring the resulting cool acid-milk mixture, and then warming the acidified milk to a temperature of about 75° F. while maintaining the acidified milk in a quiescent state.

13. The process of preparing acid curd adaptable for use in the manufacture of cottage cheese which comprises adding a water-soluble, non-toxic acid to cool skim milk at a temperature of about 35 to 45° F., the amount of acid added being such as to provide the milk, when at a temperature of 70° F., with a pH of about 4.5 to 4.7, stirring the resulting cool acid-milk mixture, and then warming the acidified milk to a temperature of about 75° F. while maintaining the acidified milk in a quiescent state.

14. The process of claim 13, where the water-soluble, non-toxic acid is selected from the group consisting of hydrochloric acid, phosphoric acid, lactic acid and acetic acid.

15. The process of claim 13, which includes the addition of rennet to the skim milk prior to the coagulation of the milk.

16. The process of preparing acid curd adaptable for use in the manufacture of cottage cheese which comprises adding hydrochloric acid to cool skim milk at a temperature of about 43° F., said acid being in an amount effective to lower the pH of said milk at a temperature of 70° F. to about 4.6, stirring the resulting acidified milk, and warming the acidified milk without agitation to about 75° F. while the milk remains in a quiescent state.

References Cited in the file of this patent

UNITED STATES PATENTS

| | | |
|---|---|---|
| 1,578,820 | Geve | Mar. 20, 1926 |
| 1,868,422 | Luecke | July 19, 1932 |
| 2,141,698 | Saunders | Dec. 27, 1938 |
| 2,908,575 | Spiess et al. | Oct. 13, 1959 |